(12) United States Patent
Liu

(10) Patent No.: US 8,339,686 B2
(45) Date of Patent: Dec. 25, 2012

(54) SCANNING DEVICE

(75) Inventor: Chin-Te Liu, Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 467 days.

(21) Appl. No.: 12/647,416

(22) Filed: Dec. 25, 2009

(65) Prior Publication Data

US 2011/0157663 A1    Jun. 30, 2011

(51) Int. Cl.
*H04N 1/04* (2006.01)
(52) U.S. Cl. ......... 358/497; 358/474; 358/484; 358/482
(58) Field of Classification Search ................... 358/497, 358/474, 484, 482, 494
See application file for complete search history.

(56) References Cited

U.S. PATENT DOCUMENTS

| | | | | |
|---|---|---|---|---|
| 4,987,442 | A * | 1/1991 | Uemori | 355/50 |
| 6,903,849 | B2 * | 6/2005 | Yokota | 358/497 |
| 6,975,436 | B2 * | 12/2005 | Saito | 358/497 |

* cited by examiner

*Primary Examiner* — Houshang Safaipour
(74) *Attorney, Agent, or Firm* — Lin & Associates IP, Inc.

(57) ABSTRACT

A scanning device includes a hollow housing, a holding plate mounted to an upper portion of the housing, a guiding rod mounted in the housing and spaced from the holding plate with a predetermined distance, a reading unit slidably mounted to the guiding rod, and a flexible cable received in the housing. The flexible cable has a restrictive plate and a conducting cable attached to a top of the restrictive plate. The restrictive plate has at least one long side raised upwardly. The flexible cable is received in the housing in a folding manner, with a lower end thereof where the raised side faces upwards connected to the system controller, and an upper end thereof where the raised side faces downwards connected to the reading unit, forming an inverted-U folding portion. The raised side at the folding portion is unfolded for keeping the folding portion in shape, in scanning process.

3 Claims, 4 Drawing Sheets

SCANNING DEVICE

BACKGROUND OF THE INVENTION

1. Field of the Invention

The present invention relates to a scanning device, and particularly to a scanning device having a structure which is capable of improving the scanning quality.

2. The Related Art

A scanning apparatus is generally equipped with a scanning device for obtaining information from scanned sheets. Please refer to FIG. 8, a conventional scanning device 100' includes a housing 1', a holding plate 2', a reading unit 3', a guiding rod 4', a flexible flat cable 5' and a system controller (not shown). The holding plate 2' is made of glass and mounted to an upper portion of the housing 1' for holding a sheet 6'. The guiding rod 4' is assembled in the housing 1' and underlies the holding plate 2'. The reading unit 3' is slidably mounted to the guiding rod 4' and is repetitively moved from an end of the guiding rod 4' to an opposite end of the guiding rod 4' for reading the information on the sheet 6' and sending the related information to the system controller. One end of the flexible flat cable 5' is connected to a bottom of the reading unit 3', and the other end of the flexible flat cable 5' is connected to a power source (not shown) through the system controller, forming a folding portion. The flexible flat cable 5' is capable of supplying power to the reading unit 3', and transmitting the information between the reading unit 3' and the system controller.

However, with the scanning apparatus developing towards miniaturization, the housing 1' of the scanning device 100' is correspondingly miniaturized, with a height thereof decreasing. When the reading unit 3' is moved along the guiding rod 4' toward the other end of the flexible flat cable 5', adjacent to the power source, the folding portion of the flexible flat cable 5' has an increasing radian. Consequently, an upper portion of the folding portion rests against and scraps a bottom of the holding plate 2', which affects the scanning quality, meanwhile, wears the flexible flat cable 5'.

SUMMARY OF THE INVENTION

Accordingly, an object of the present invention is to provide a scanning device which is capable of improving the scanning quality. The scanning device controlled by a system controller for scanning a sheet includes a hollow housing, a holding plate mounted to an upper portion of the housing, a guiding rod mounted in the housing and spaced from the holding plate with a predetermined distance, a reading unit slidably mounted to the guiding rod, and a flexible cable received in the housing. The flexible cable has a restrictive plate and a conducting cable attached to a top of the restrictive plate. The restrictive plate has at least one long side raised upwardly. The flexible cable is received in the housing in a folding manner, with a lower end thereof where the raised side faces upwards connected to the system controller which is mounted in the housing and under the guiding rod, and an upper end thereof where the raised side faces downwards connected to the reading unit, forming an inverted-U folding portion. The raised side at the folding portion is unfolded for keeping the folding portion in shape, in scanning process.

As described above, the scanning device is equipped with the restrictive plate in a folding manner. The restrictive plate has at least one side raised upwards, which is unfolded at the folding portion and keeps the folding portion in shape, preventing the radian of the folding portion from increasing, thereby avoiding resting against and scraping the holding plate in scanning process. Therefore, the structure of the restrictive plate is simple and easy to manufacture, meanwhile, it prevents from interfering with the holding plate, guarantees the scanning quality and prolongs the use time of the restrictive plate.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
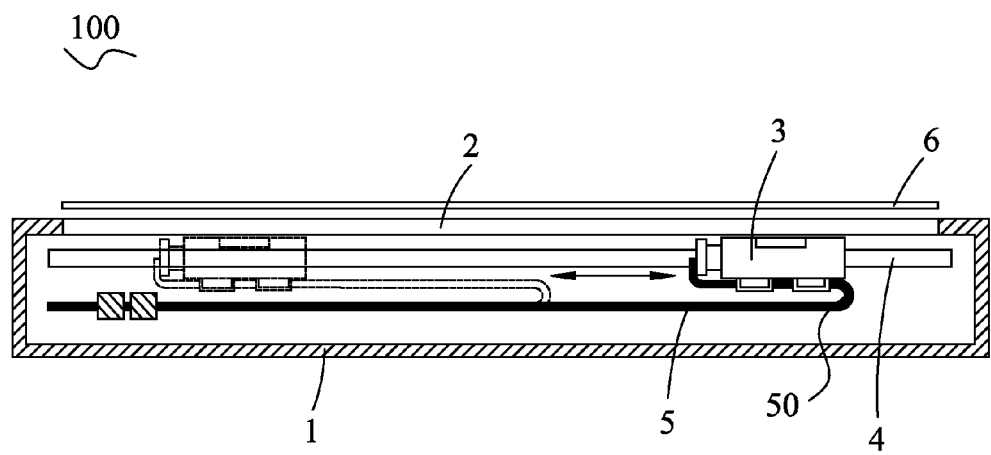
FIG. 1 is a cross-sectional view of a scanning device of an embodiment in accordance with the present invention.

Referring to the drawings in greater detail, and first to FIG. 1, the embodiment of the invention is shown in a scanning device 100. The scanning device 100 comprises a hollow housing 1, a holding plate 2, a reading unit 3, a guiding rod 4, a flexible cable 5 and a system controller (not shown).

The holding plate 2 is made of glass for allowing the light to pass therethrough, and mounted to an upper portion of the housing 1 for holding a sheet 6. The guiding rod 4 is assembled in the housing 1 and spaced from the holding plate 2 with a predetermined distance. The reading unit 3 is slidably mounted to the guiding rod 4 and is repetitively moved along the guiding rod 4, as indicated by an arrow, for reading information on the sheet 6 and sending the related information to the system controller. A lower end of the flexible cable 5 is connected to a power source (not shown) and the system controller, and an upper end of the flexible cable 5 is folded up and connected to a bottom of the reading unit 3, forming a folding portion 50. The flexible cable 5 is capable of supplying power to the reading unit 3, and transmitting the information between the reading unit 3 and the system controller.

Figure 2:
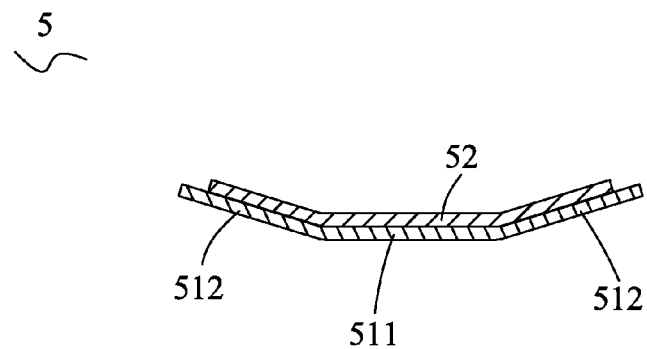
FIG. 2 is a cross-sectional view of a flexible cable of a first embodiment in the scanning device of FIG. 1.
Figure 3:
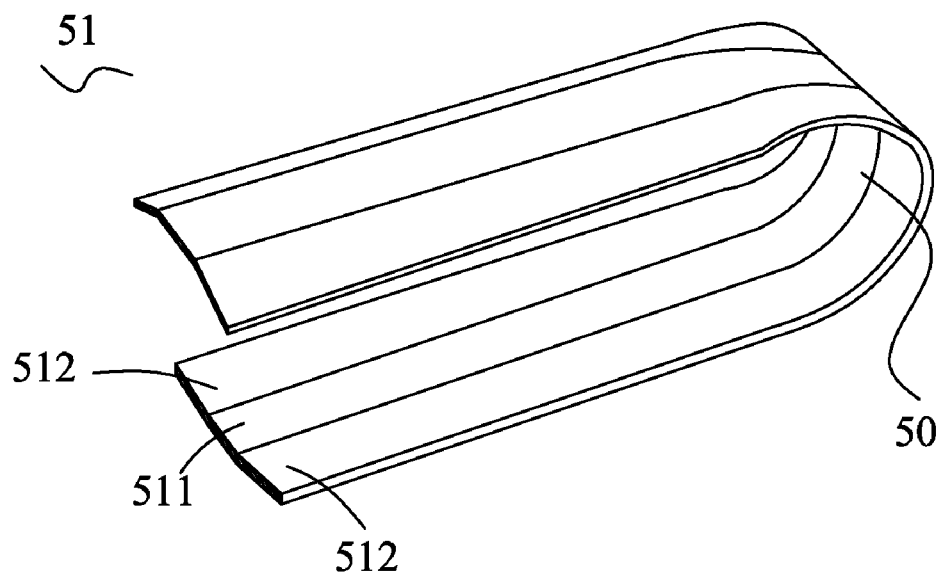
FIG. 3 is a perspective view of the flexible cable of the scanning device shown in FIG. 2.
Figure 4:
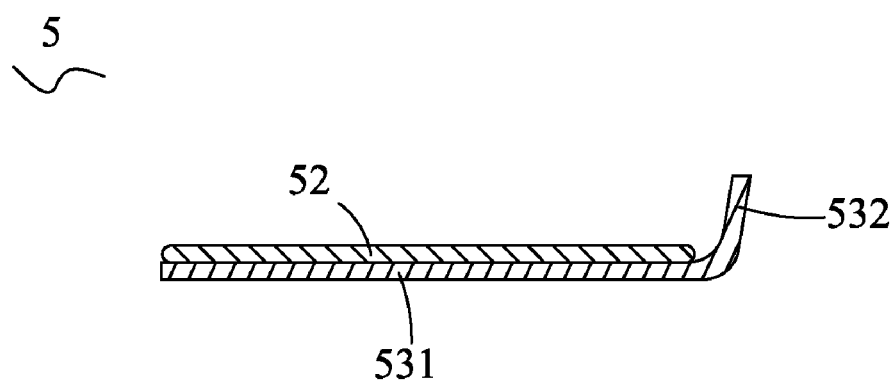
FIG. 4 is a cross-sectional view of a flexible cable of a second embodiment in the scanning device of FIG. 1.
Figure 5:
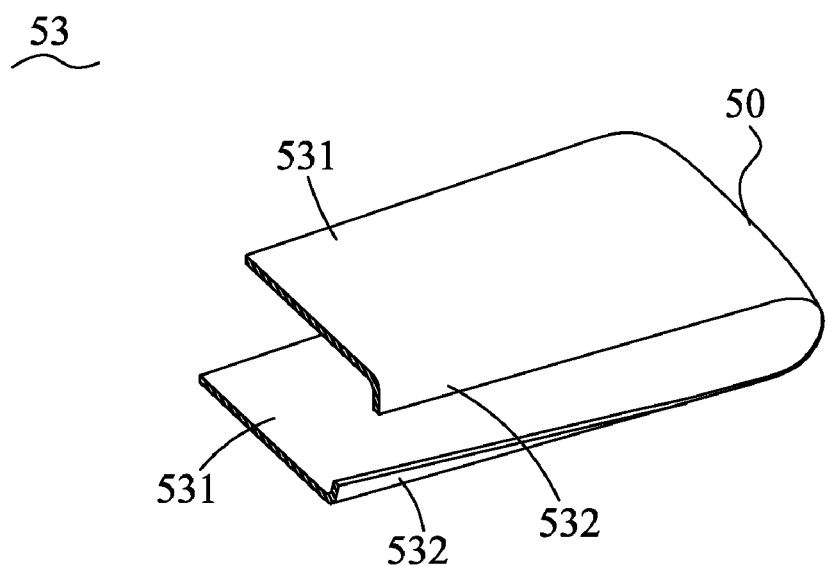
FIG. 5 is a perspective view of the flexible cable of the scanning device shown in FIG. 4.

Please refer to FIGS. 2-3, The flexible cable 5 in the first embodiment has a restrictive plate 51 and a flat conducting cable 52. The restrictive plate 51 has an elongated flat portion 511 and two winging portions 512 extended obliquely and upwardly from two opposite long sides of the flat portion 511, respectively forming an acute angle with a plane of the flat portion 511, under the condition of being free from affection. The conducting cable 52 is flexible and has a width less than that of the restrictive plate 51. The conducting cable 52 is attached to a top surface of the restrictive plate 51 and bent in accordance with the restrictive plate 51.

Referring to FIGS. 1-3, the restrictive plate 51 has an upper end fixed to the bottom of the reading unit 3, where the winging portions 512 facing downwards, and a lower end connected to the power source, where the winging portions 512 facing upwards. An upper end of the conducting cable 52 is fixed to the reading unit 3 and electrically connected with a reading component (not shown) in the reading unit 3. A lower end of the conducting cable 52 is electrically connected with the system controller and the power source. The folding portion 50 is a substantially inverted-U shape, where the winging portions 512 are forced to unfold, conforming to the bent flat portion 511.

When the scanning device 100 is in work, the reading unit 3 is controlled to move along the guiding rod 4 for scanning the sheet 6 on the holding plate 2 and sends the obtained information to the system controller by the conducting cable 52. In this process, the position of the folding portion 50 is altered in the flexible cable 5. When the two opposite ends of the flexible cable 5 are closest to each other, the folding portion 50 is substantially located at a middle portion of the flexible cable 5, where the radian of the conventional folding portion gets up to the maximum value. The folding portion 50 is still an invented-U shape as a result of the winging portions 512 being unfolded to generate stress to restrain the radian of the folding portion 50 from increasing, accordingly, preventing the folding portion 50 from resting against and scraping a bottom of the holding plate 2.

Figure 6:
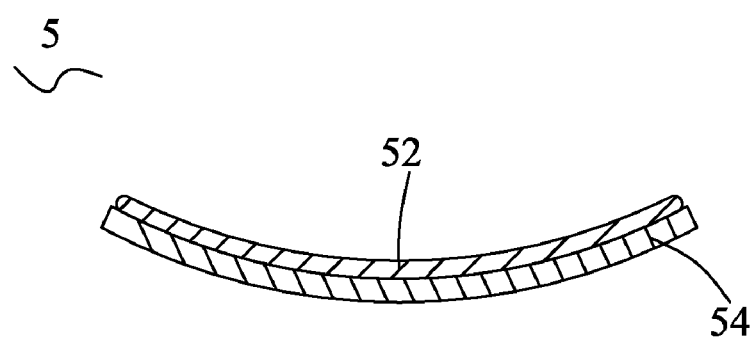
FIG. 6 is a cross-sectional view of a flexible cable of a third embodiment in the scanning device of FIG. 1.
Figure 7:
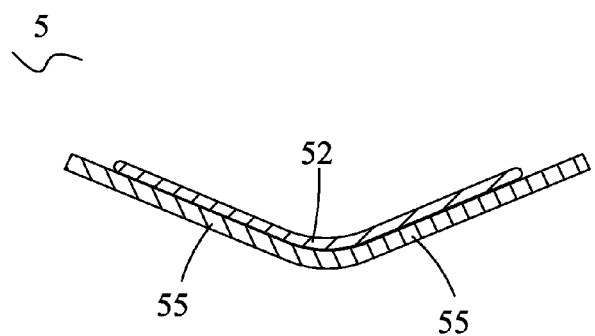
FIG. 7 is a cross-sectional view of a flexible cable of a fourth embodiment in the scanning device of FIG. 1.
Figure 8:
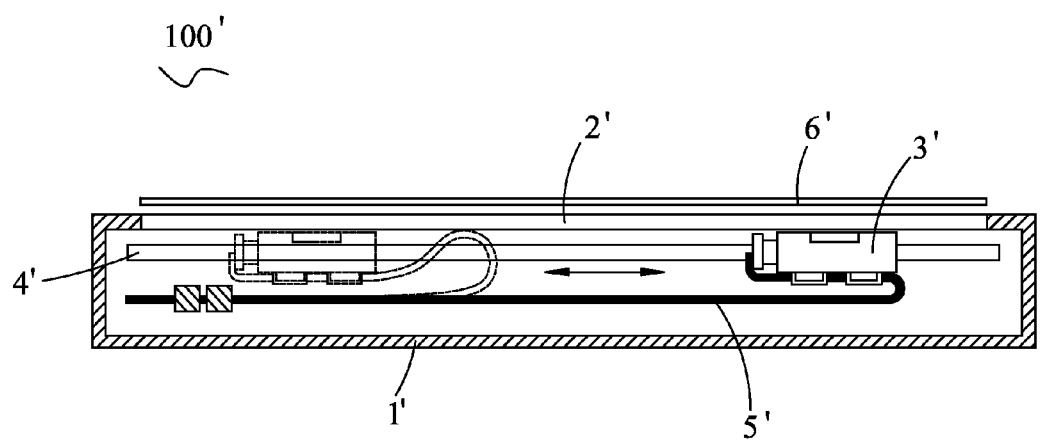
FIG. 8 is a cross-sectional view of a scanning device in prior art.

Please refer to FIGS. 4-7, the structure of the restrictive plate can also be altered for meeting various demands and should not be limited. For instance, the restrictive plate 53 in the second embodiment, shown in FIGS. 4-5, has a flat main portion 531 of strip shape and a bent portion 532 bent upwards from one long side of the main portion 531, under the condition of being free from affection. When the restrictive plate 53 is assembled to the scanning device 100, the bent portion 532 is unfolded so that the folding portion 50 of the restrictive plate 53 is restrained to keep a substantially inverted-U shape all the time. In the third embodiment, the restrictive plate 54 shown in FIG. 6 is formed with an arc shape, as viewed in the cross-section, with two opposite sides thereof facing upwardly. In FIG. 7, the restrictive plate 55 in the fourth embodiment is formed with a V shape, as viewed in the cross-section, with two opposite sides thereof facing upwardly.

As described above, the scanning device 100 is equipped with the restrictive plate in a folding manner. The restrictive plate has at least one side raised upwards, which is unfolded at the folding portion and keeps the folding portion in shape, preventing the radian of the folding portion from increasing, thereby avoiding resting against and scraping the holding plate in scanning process. Therefore, the structure of the restrictive plate is simple and easy to manufacture, meanwhile, it prevents from interfering with the holding plate, guarantees the scanning quality and prolongs the use time of the restrictive plate.

The foregoing description of the present invention has been presented for the purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A scanning device controlled by a system controller for scanning a sheet, comprising:
   a hollow housing;
   a holding plate mounted to an upper portion of the housing;
   a guiding rod mounted in the housing and spaced from the holding plate with a predetermined distance;
   a reading unit slidably mounted to the guiding rod; and
   a flexible cable received in the housing, the flexible cable having a restrictive plate and a conducting cable attached to a top of the restrictive plate, the restrictive plate having an elongated flat portion and two winging portions extended obliquely and upwardly from two opposite long sides of the flat portion with each winging portion forming a raised side having an acute angle with a plane of the flat portion,
   wherein the flexible cable is received in the housing in a folding manner, with a lower end thereof where the raised side faces upwards connected to the system controller which is mounted in the housing and under the guiding rod, and an upper end thereof where the raised side faces downwards connected to the reading unit, forming an inverted-U folding portion, and the raised side at the folding portion is unfolded for keeping the folding portion in shape in scanning process.

2. A scanning device controlled by a system controller for scanning a sheet, comprising:
   a hollow housing;
   a holding plate mounted to an upper portion of the housing;
   a guiding rod mounted in the housing and spaced from the holding plate with a predetermined distance;
   a reading unit slidably mounted to the guiding rod; and
   a flexible cable received in the housing, the flexible cable having a restrictive plate and a conducting cable attached to a top of the restrictive plate, the restrictive plate having a flat main portion of strip shape and a bent portion bent upwards forming a raised side from one long side of the main portion,
   wherein the flexible cable is received in the housing in a folding manner, with a lower end thereof where the raised side faces upwards connected to the system controller which is mounted in the housing and under the guiding rod, and an upper end thereof where the raised side faces downwards connected to the reading unit, forming an inverted-U folding portion, and the raised side at the folding portion is unfolded for keeping the folding portion in shape in scanning process.

3. A scanning device controlled by a system controller for scanning a sheet, comprising:
   a hollow housing;
   a holding plate mounted to an upper portion of the housing;
   a guiding rod mounted in the housing and spaced from the holding plate with a predetermined distance;
   a reading unit slidably mounted to the guiding rod; and
   a flexible cable received in the housing, the flexible cable having a restrictive plate and a conducting cable attached to a top of the restrictive plate, the restrictive plate being formed with an arc shape, as viewed in a cross-section, with two opposite sides facing upwards, each of the two opposite sides forming a raised side,
   wherein the flexible cable is received in the housing in a folding manner, with a lower end thereof where the raised side faces upwards connected to the system controller which is mounted in the housing and under the guiding rod, and an upper end thereof where the raised side faces downwards connected to the reading unit, forming an inverted-U folding portion, and the raised side at the folding portion is unfolded for keeping the folding portion in shape in scanning process.

* * * * *